US009667975B2

United States Patent
Park et al.

(10) Patent No.: US 9,667,975 B2
(45) Date of Patent: *May 30, 2017

(54) METHOD AND APPARATUS FOR TRANSMITTING VIDEO CONTENTS COMPRESSED BY CODEC

(75) Inventors: Sung-bum Park, Seongnam-si (KR); Hae-young Jun, Seoul (KR); Dong-seek Park, Yongin-si (KR)

(73) Assignee: SAMSUNG ELECRONICS CO., LTD., Suwon-si (KR)

( * ) Notice: Subject to any disclaimer, the term of this patent is extended or adjusted under 35 U.S.C. 154(b) by 1350 days.

This patent is subject to a terminal disclaimer.

(21) Appl. No.: 12/964,905

(22) Filed: Dec. 10, 2010

(65) Prior Publication Data

US 2011/0142122 A1  Jun. 16, 2011

Related U.S. Application Data

(60) Provisional application No. 61/294,632, filed on Jan. 13, 2010, provisional application No. 61/294,218, (Continued)

(30) Foreign Application Priority Data

Sep. 13, 2010 (KR) .......... 10-2010-0089461

(51) Int. Cl.
*H04N 7/12* (2006.01)
*H04N 19/164* (2014.01)
(Continued)

(52) U.S. Cl.
CPC .......... *H04N 19/164* (2014.11); *H04N 19/12* (2014.11); *H04N 19/162* (2014.11); (Continued)

(58) Field of Classification Search
CPC ... H04L 65/1083; H04L 65/607; H04L 67/34; H04L 29/06027; H04L 65/1009;
(Continued)

(56) References Cited

U.S. PATENT DOCUMENTS

2007/0058794 A1* 3/2007 Abrol ................ H04L 29/06027
379/202.01
2008/0025414 A1  1/2008 Kim et al.
2009/0154556 A1* 6/2009 Kim ................... H04L 65/1083
375/240.02

FOREIGN PATENT DOCUMENTS

CN 101123730 A  2/2008
EP 1 883 244 A2  1/2008
(Continued)

OTHER PUBLICATIONS

International Search Report for PCT/KR2010/008844 dated Aug. 11, 2011 [PCT/ISA/210].
(Continued)

*Primary Examiner* — Dakshesh Parikh
(74) *Attorney, Agent, or Firm* — Sughrue Mion, PLLC

(57) ABSTRACT

A method and apparatus for transmitting compressed video content are provided. The method includes transmitting a codec selection request frame, the codec selection request frame including an identifier of one or more codecs to be used to compress video content and requesting approval of the use of the codec, receiving a codec selection response frame, the codec selection response frame including result information indicating whether the use of the codec is approved, and transmitting video content frames for the video content compressed by the approved codec based on the codec selection response frame. Each video content frame includes frame type information indicating a type of compression applied to the video content included in the video content frame.

22 Claims, 9 Drawing Sheets

Related U.S. Application Data filed on Jan. 12, 2010, provisional application No. 61/285,247, filed on Dec. 10, 2009.

(51) Int. Cl.
*H04N 21/258* (2011.01)
*H04N 21/6336* (2011.01)
*H04N 21/6379* (2011.01)
*H04N 19/172* (2014.01)
*H04N 19/46* (2014.01)
*H04N 19/12* (2014.01)
*H04N 19/162* (2014.01)
*H04N 21/235* (2011.01)

(52) U.S. Cl.
CPC .......... *H04N 19/172* (2014.11); *H04N 19/46* (2014.11); *H04N 21/25808* (2013.01); *H04N 21/6336* (2013.01); *H04N 21/6379* (2013.01); *H04N 21/2353* (2013.01)

(58) Field of Classification Search
CPC .......... H04L 65/1069; H04N 19/00078; H04N 19/0023; H04N 19/00236; H04N 19/00266; H04N 19/00545; H04N 21/2353; H04N 7/147; H04W 24/00; H04W 76/02
USPC .... 375/240.01, 240.02, E7.126; 348/E7.081; 379/202.01; 455/416
See application file for complete search history.

(56) References Cited

FOREIGN PATENT DOCUMENTS

| | | |
|---|---|---|
| KR | 10-2005-0036383 A | 4/2005 |
| KR | 10-2005-0096622 A | 10/2005 |
| KR | 10-2005-0096623 A | 10/2005 |
| KR | 10-2005-0096625 A | 10/2005 |
| KR | 10-2008-0010841 A | 1/2008 |
| KR | 10-2009-0061914 A | 6/2009 |
| TW | 200948076 A1 | 11/2009 |
| WO | 2009/098933 A1 | 8/2009 |

OTHER PUBLICATIONS

Written Opinion for PCT/KR2010/008844 dated Aug. 11, 2011 [PCT/ISA/237].
Communication, dated Feb. 10, 2014, issued by the European Patent Office in counterpart European Application No. 10836229.4.
Grayver, Eugene et al., "Application-layer Codec Adaptation for Dynamic Bandwidth Resource Allocation," The Aerospace Corporation, IEEE, Mar. 1, 2008, pp. 1-8.
Rosenberg, J. et al., "SIP: Session Initiation Protocol," Network Working Group, Jun. 1, 2002, pp. 1-270.
Rosenberg, J. et al. "An Offer/Answer Model with the Session Description Protocol (SDP)," Network Working Group, Jun. 1, 2002, pp. 1-26.
Schulzrinne, H. et al., "RTP Profile for Audio and Video Conferences with Minimal Control," Network Working Group, Jul. 1, 2003, pp. 1-45.
Communication dated Nov. 28, 2014 issued by the State Intellectual Property Office of the People's Republic of China in counterpart Chinese Patent Application No. 201080063610.6.
Communication dated Aug. 22, 2016 issued by the Korean Intellectual Property Office in counterpart Korean Patent Application No. 10-2010-0089461.
Communication dated Feb. 23, 2017 issued by the Korean Intellectual Property Office in counterpart Korean Patent Application No. 10-2010-0089461.

* cited by examiner

FIG. 10
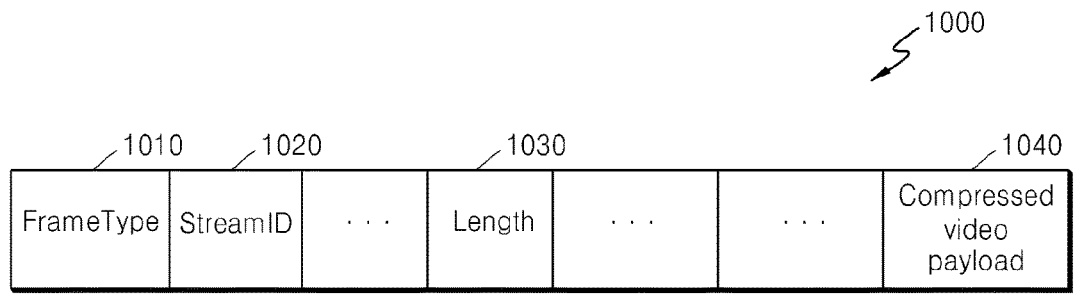
FIG. 11
| value | Frame type |
|---|---|
| 0x00 | Uncompressed Video data frame |
| 0x01 | H.264 Compressed Video data frame |
| 0x02 | Vendor Specific Compressed Video data frame |
| | ⋮ |
FIG. 12
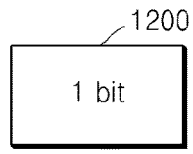
FIG. 13
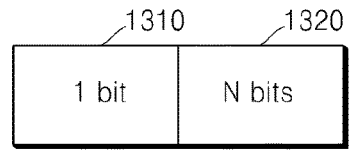
FIG. 14
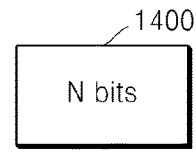

METHOD AND APPARATUS FOR TRANSMITTING VIDEO CONTENTS COMPRESSED BY CODEC

CROSS-REFERENCE TO RELATED PATENT APPLICATION

This application claims priority from Korean Patent Application No. 10-2010-0089461, filed on Sep. 13, 2010, in the Korean Intellectual Property Office, and claims the benefit of priority from U.S. Provisional Application No. 61/285,247, filed on Dec. 10, 2009, U.S. Provisional Application No. 61/294,218, filed on Jan. 12, 2010, and U.S. Provisional Application No. 61/294,632, filed on Jan. 13, 2010 in the U.S. PTO, the disclosures of which are incorporated by reference herein in their entireties.

BACKGROUND

1. Field

Methods and apparatuses consistent with exemplary exemplary embodiments relate to transmitting video contents compressed by a codec, and more particularly, to transmitting at least one video content compressed by using at least one of a plurality of different codecs.

2. Description of the Related Art

Methods of transmitting video contents between devices over a wireless network may include a method of transmitting video contents in a non-compressive manner and a method of transmitting video contents compressed by a codec.

When video contents are transmitted in a non-compressive manner, the video contents can be transmitted without any degradation in quality of the video contents. However, since non-compressive transmission takes a long time, it is difficult to use non-compressive transmission when the video contents are reproduced in real time or a bandwidth of a communication link between devices is small.

As a result, for a small bandwidth communication link or real-time reproduction of video contents, the video contents are transmitted in a form compressed by a codec. In this case, however, a receiving side needs to be notified about the type of codec used for the compression of the video contents.

SUMMARY

One or more exemplary embodiments may address the disadvantages described above and other disadvantages not described above. However, it is understood that one or more exemplary embodiments are not required to overcome the disadvantages described above, and may not overcome any of the disadvantages described above.

One or more exemplary embodiments provide a method and apparatus for transmitting video content compressed by a codec.

According one or more exemplary embodiments, there is provided a method of transmitting compressed at least one video content. The method includes transmitting a codec selection request frame, the codec selection request frame comprising an identifier of at least one codec to be used to compress at least one video content and requesting approval of a use of the at least one codec; receiving a codec selection response frame, the codec selection response frame comprising at least one result information indicating whether the use of the at least one codec is approved; and transmitting a video content frame comprising the at least one video content compressed by the approved at least one codec based on the codec selection response frame, wherein the video content frame further comprises frame type information indicating a type of compression applied to the at least one video content in the video content frame.

The frame type information may indicate whether the at least one video content in the video content frame has been compressed by a first codec, which is a default codec, or by one of a plurality of second codecs, which are codecs provided by codec vendors.

The frame type information may include a first field indicating whether the at least one video content in the video content frame has been compressed by a first codec, which is a default codec, or by one of a plurality of second codecs, which are codecs provided by codec vendors.

The frame type information may further include a second field indicating which one of the plurality of second codecs has been used to compress the at least one video content in each of the video content frame.

The frame type information may include a field indicating which one of a group of codecs including a first codec, which is a default codec, and a plurality of second codecs which are codecs provided by codec vendors, has been used to compress the at least one video content in the video content frame.

The method may further include transmitting, from a first device, an identifier of at least one codec supported by the first device to a second device and receiving, by the first device, an identifier of at least one codec supported by the second device from the second device, in which the identifier of the at least one codec included in the codec selection request frame is generated based on the identifier of the at least one codec supported by the second device.

The method may further include transmitting, from a first device, a capability request frame requesting information about a capability of a second device to the second device and receiving a capability response frame including the identifier of at least one codec supported by the second device from the second device in response to the capability request frame, in which the identifier of the at least one codec included in the codec selection request frame is generated based on the capability response frame.

The capability request frame may include a fourthcodec support field indicating whether the first device supports second codecs which are codecs provided by codec vendors, and a codec number field indicating the number of second codecs supported by the first device.

The capability request frame may further include a codec identifier field indicating identifiers of the second codecs.

The method may further include receiving the identifier of at least one supported codec, in which the identifier of the at least one codec in the codec selection request frame is generated based on the received identifier of the at least one supported codec.

According to one or more exemplary embodiments, there is provided an apparatus for transmitting compressed at least one video content. The apparatus includes a transmission unit that transmits a codec selection request frame, the codec selection request frame comprising an identifier of at least one codec to be used to compress at least one video content and requesting approval of a use of the at least one codec; and a reception unit that receives a codec selection response frame, the codec selection response frame comprising at least one result information indicating whether the use of the at least one codec is approved, wherein the transmission unit further transmits a video content frame comprising the at least one video content compressed by the approved at least one codec based on the codec selection response frame, and the video content frame further comprises frame type information indicating a type of compression applied to the at least one video content in the video content frame.

According to one or more exemplary embodiments, there is provided a computer-readable recording medium having recorded thereon a program for executing a method of transmitting compressed at least one video content. The method includes transmitting a codec selection request frame, the codec selection request frame comprising an identifier of at least one codec to be used to compress at least one video content and requesting approval of a use of the at least one codec; receiving a codec selection response frame, the codec selection response frame comprising at least one result information indicating whether the use of the at least one codec is approved; and transmitting a video content frame comprising the at least one video content compressed by the approved at least one codec based on the codec selection response frame, wherein the video content frame further comprises frame type information indicating a type of compression applied to the at least one video content in the video content frame.

BRIEF DESCRIPTION OF THE DRAWINGS

The above and/or other aspects will become more apparent by describing in detail exemplary embodiments thereof with reference to the attached drawings in which:

FIG. 10 is a diagram for describing a structure of a video content frame according to exemplary embodiment;

FIG. 11 is a diagram for describing a frame type field according to an exemplary embodiment;

FIG. 12 is a diagram for describing a structure of a frame type field according to an exemplary embodiment;

FIG. 13 is a diagram for describing a structure of a frame type field according to another exemplary embodiment;

FIG. 14 is a diagram for describing a structure of a frame type field according to another exemplary embodiment;

DETAILED DESCRIPTION

Hereinafter, exemplary embodiments will be described in detail with reference to the accompanying drawings. Expressions such as "at least one of," when preceding a list of elements, modify the entire list of elements and do not modify the individual elements of the list.

Figure 1:
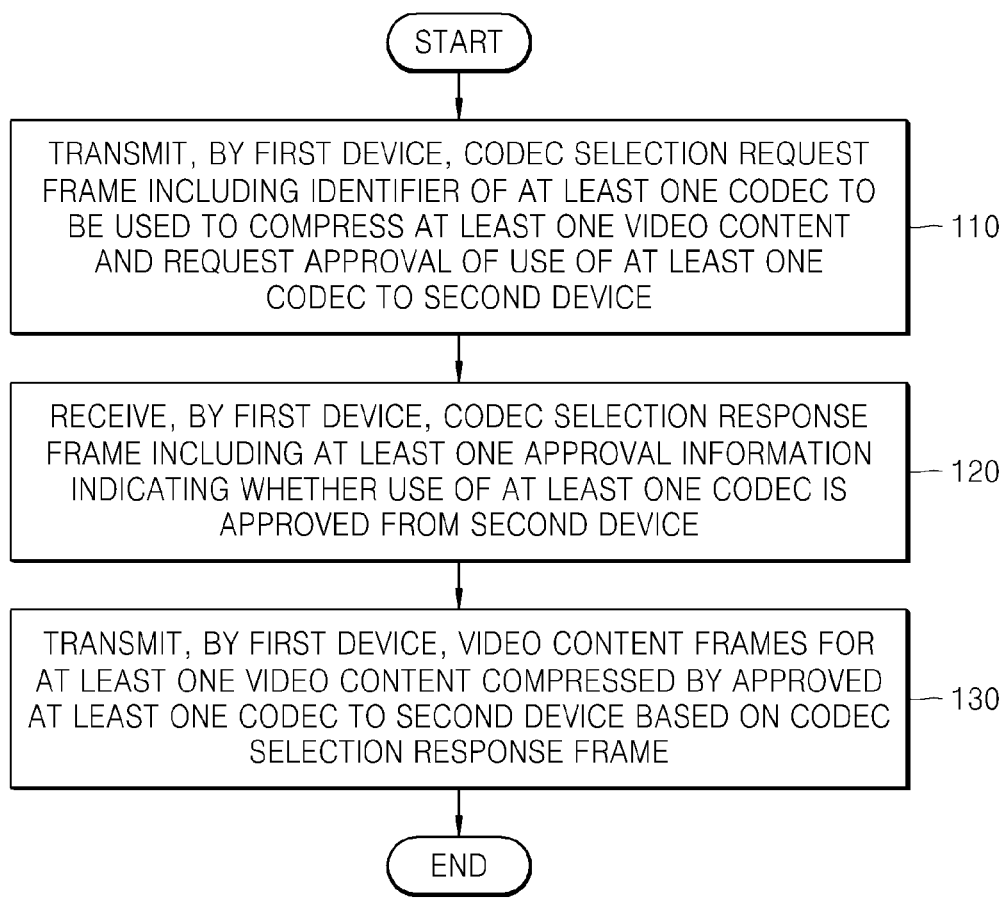
FIG. 1 is a flowchart illustrating a method of transmitting video contents, according to an exemplary embodiment.

FIG. 1 is a flowchart illustrating a method of transmitting video contents, according to an exemplary embodiment.

In operation 110, a first device transmits a codec selection request frame, which includes an identifier of at least one codec to be used for compression of at least one video content and requests approval of the use of the at least one codec, to a second device.

The first device includes a device for transmitting the video content, and the second device includes a device for receiving the video content.

A structure of the codec selection request frame according to an exemplary embodiment will be described later with reference to FIGS. 6 and 7.

In operation 120, the first device receives a codec selection response frame, which includes at least one approval information indicating whether the use of the at least one codec is approved, from the second device.

If the codec selection request frame transmitted in operation 110 includes a plurality of codec identifiers, the codec selection response frame may also include a plurality of approval information, each of which may indicate approval or rejection for each of the plurality of codec identifiers.

A structure of the codec selection request frame according to an exemplary embodiment will be described later with reference to FIGS. 8 and 9.

In operation 130, the first device transmits video content frames for at least one video content compressed by the approved at least one codec to the second device, based on the codec selection response frame.

For example, if approval of the use of a codec A and a codec B for two transmission video contents is requested through the codec selection request frame and the use of the codec A and the codec B for the two video contents is approved through the codec selection response frame, the first device compresses the first video content by using the codec A for transmission and compresses the second video content by using the codec B for transmission.

The first device transmits video contents in a manner that video content is divided into a plurality of video content frames and the divided video content frames are transmitted to the second device. Each of the video content frames may further include frame type information indicating a type of compression applied to the video content of each video content frame.

A structure of the video content frame according to an exemplary embodiment will be described later with reference to FIG. 10.

Figure 2:
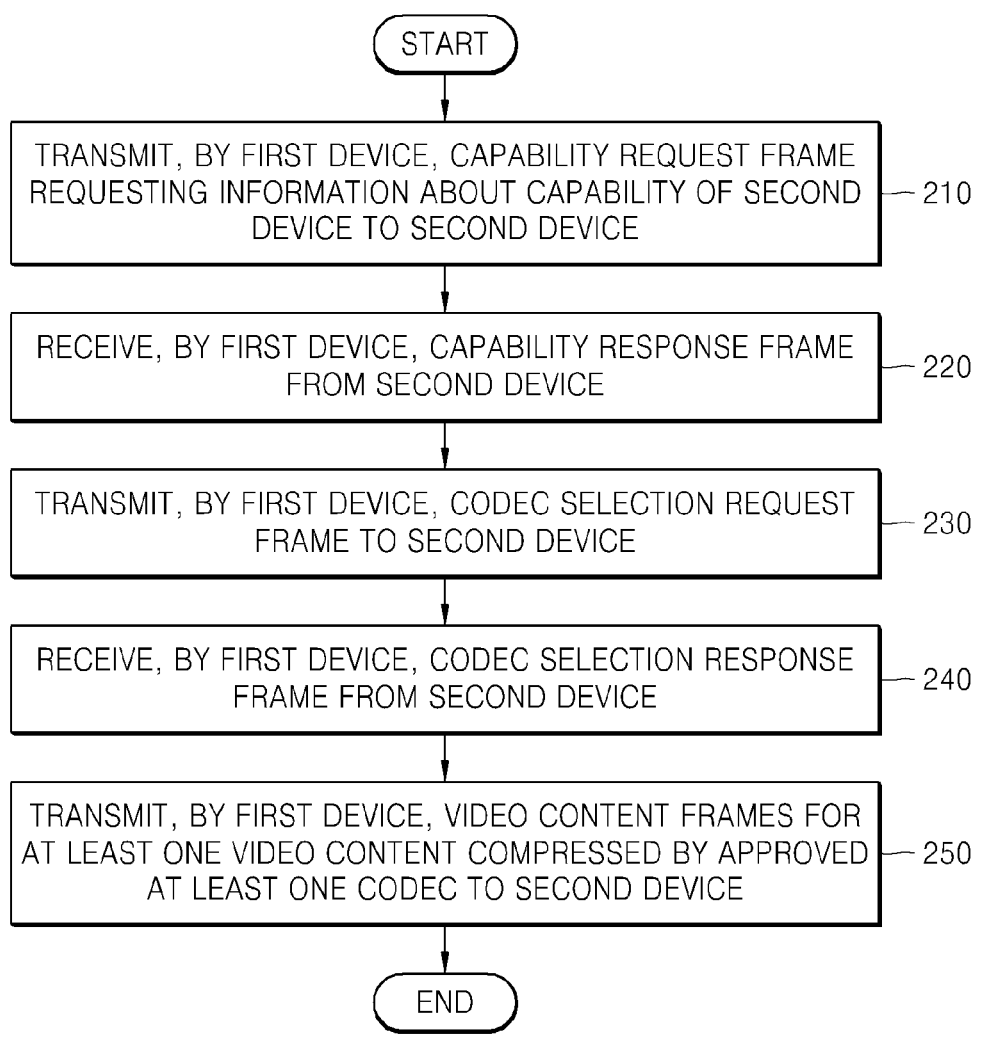
FIG. 2 is a flowchart illustrating a method of transmitting video contents, according to another exemplary embodiment.

FIG. 2 is a flowchart illustrating a method of transmitting video contents, according to another exemplary embodiment.

In operation 210, the first device transmits a capability request frame requesting information about a capability of the second device to the second device.

The capability request frame may include an identifier of at least one codec supported by the first device. If the first device supports a plurality of codecs, a plurality of codec identifiers are included in the capability request frame and the plurality of codecs may be provided by different codec vendors.

A structure of the capability request frame according to an exemplary embodiment will be described later with reference to FIG. 15.

In operation 220, the first device receives a capability response frame including an identifier of at least one codec supported by the second device from the second device in response to the capability request frame.

A structure of the capability response frame according to an exemplary embodiment will be described later with reference to FIG. 16.

In operation 230, the first device transmits a codec selection request frame, which includes an identifier of at least one codec to be used for compression of at least one video content and requests approval for the use of the at least one codec, to the second device.

The identifier of the at least one codec included in the codec selection request frame may be generated based on the capability response frame received in operation 220. For example, the identifier of the at least one codec included in the codec selection request frame may include at least one codec supported by the second device based on the capability response frame.

In operation 240, the first device receives a codec selection response frame, which includes at least one approval information indicating whether the use of the at least one codec is approved, from the second device.

In operation 250, the first device transmits video content frames of at least one video content compressed by the approved at least one codec to the second device based on the codec selection response frame.

Figure 3:
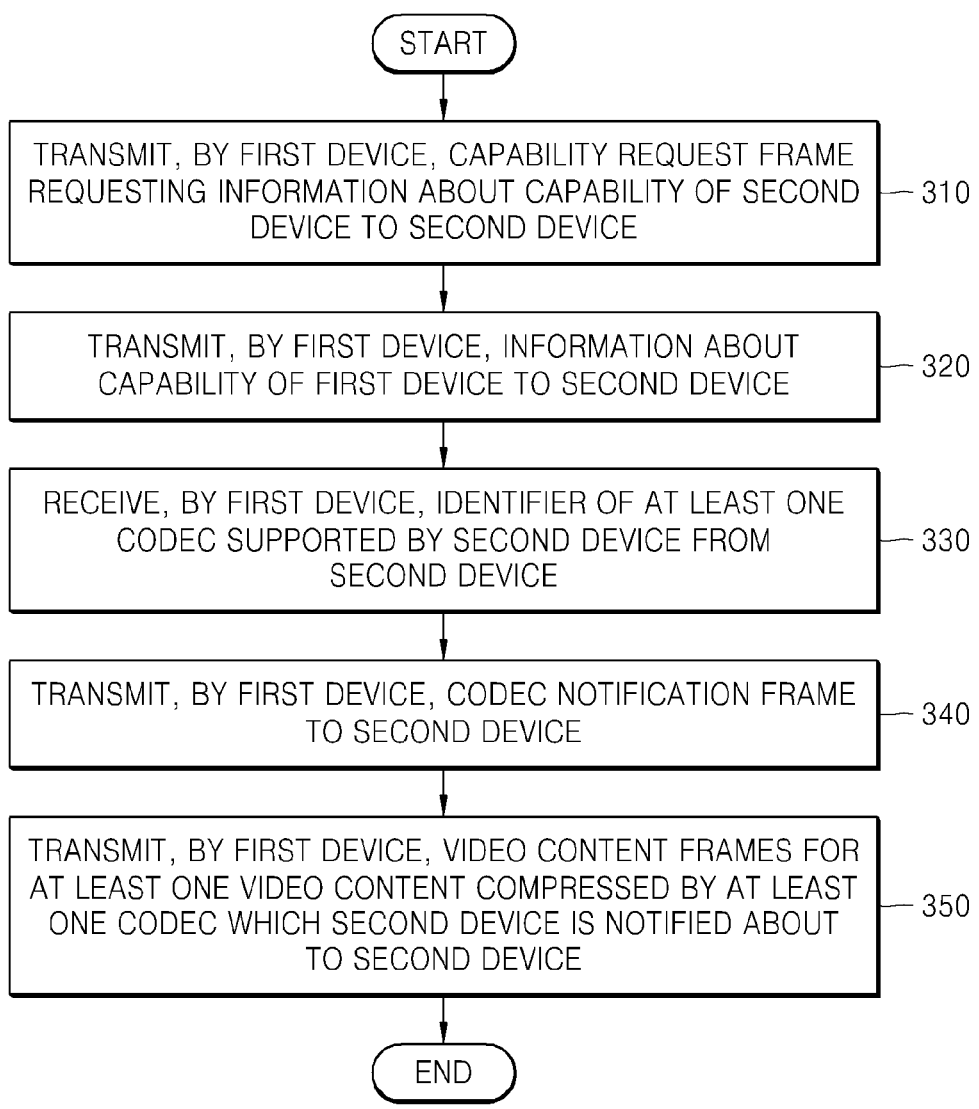
FIG. 3 is a flowchart illustrating a method of transmitting video contents, according to another exemplary embodiment.

FIG. 3 is a flowchart illustrating a method of transmitting video contents, according to another exemplary embodiment.

In operation 310, the first device transmits a capability request frame requesting information about a capability of the second device to the second device.

In operation 320, the first device transmits information about a capability of the first device to the second device.

For example, the first device may transmit an identifier of at least one codec supported by the first device as the information about the capability of the first device to the second device.

Alternatively, in another exemplary embodiment, the first device may transmit the capability request frame including information about the capability of the first device to the second device in operation 310 and operation 320 may be skipped.

The information about the capability of the first device according to an exemplary embodiment will be described later with reference to FIGS. 17 and 18.

In operation 330, the first device receives an identifier of at least one codec supported by the second device to the second device in response to the capability request frame.

In operation 340, the first device determines at least one codec to be used for compression of at least one transmission video content based on the received identifier of the at least one codec supported by the second device, and then transmits a codec notification frame for notifying the second device about the determined at least one codec.

Alternatively, in another exemplary embodiment, the first device may transmit the identifier of the at least one codec to be used for compression of the at least one transmission video content to the second device, instead of the codec notification frame.

In operation 350, the first device transmits video content frames of the at least one video content compressed by the at least one codec about which the second device was notified to the second device.

Before transmitting video content to the second device, the first device creates a session with the second device for transmission of the video content. After the session starts, when the first device performs a process of determining a codec to be used for compression of transmission video content as in operations 310 through 340, a process of determining a new codec is not performed in principle until the session is ended.

However, if an unusual situation occurs, such as when characteristics of new video content to be transmitted from the first device to the second device are changed after the start of the session, and thus the new transmission video content needs to be compressed by a new codec, a process of determining the new codec may be performed whenever the unusual situation occurs even before the end of the session.

For example, if the second device needs to transmit other video content frames to the first device during transmission of video content frames from the first device to the second device, a process of determining a new codec between the first device and the second device may be performed.

Such features of the exemplary embodiments shown in FIG. 3 may be equally applied to the exemplary embodiment shown in FIG. 1 and the exemplary embodiment shown in FIG. 2.

In the exemplary embodiment shown in FIG. 2 and the exemplary embodiments shown in FIG. 3, before the first device transmits the codec selection request frame or the codec notification frame to the second device, a process of receiving an identifier of a codec supported by the second device from the second device is performed. A method of receiving an identifier of a codec supported by the second device is not limited to the exemplary embodiment shown in FIG. 2 or the exemplary embodiments shown in FIG. 3.

Hereinafter, a method of receiving information about a codec supported by the second device will be described with reference to FIGS. 4 and 5.

Figure 4:
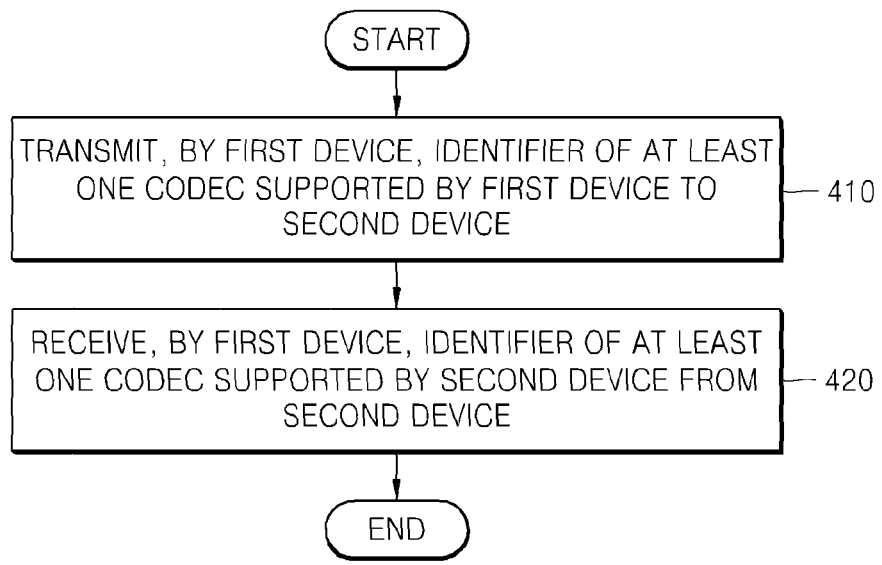
FIG. 4 is a flowchart illustrating a method of receiving information about a codec supported by a second device, according to an exemplary embodiment.

FIG. 4 is a flowchart illustrating a method of receiving information about a codec supported by the second device, according to an exemplary embodiment.

In operation 410, the first device transmits an identifier of at least one codec supported by the first device to the second device.

In operation 420, the first device receives an identifier of at least one codec supported by the second device which has received the identifier of the at least one codec supported by the first device from the first device.

At this time, the first device may generate a codec selection request frame based on the received identifier of the at least one codec supported by the second device.

While the first device first transmits the identifier of the at least one codec supported by the first device to the second device and then the second device correspondingly transmits the identifier of the at least one codec supported by the second device to the first device in the current exemplary embodiment, the present invention is not limited thereto and the second device may first transmit the identifier of the at least one codec supported by the second device to the first device and then the first device correspondingly transmits the identifier of the at least one codec supported by the first device to the second device in another exemplary embodiment.

Figure 5:
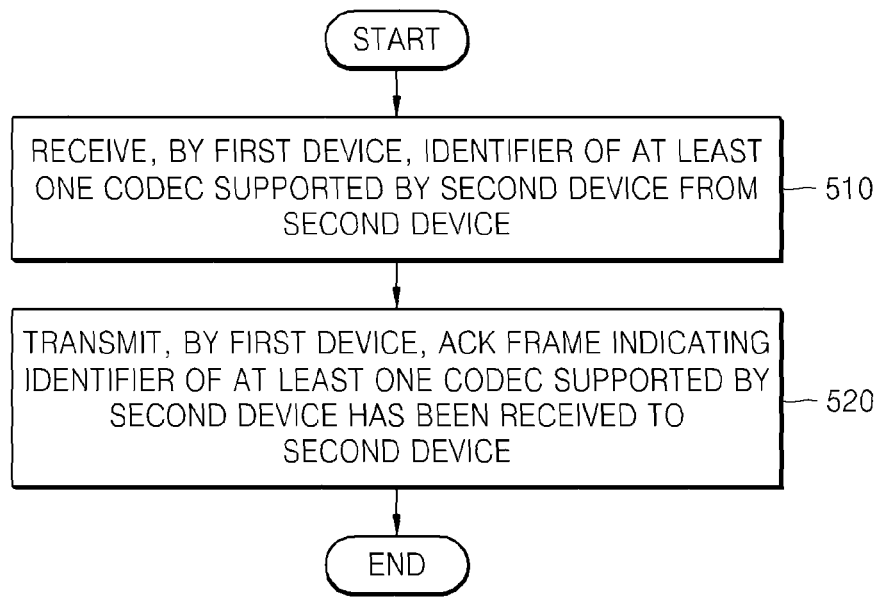
FIG. 5 is a flowchart illustrating a method of receiving information about a codec supported by a second device, according to another exemplary embodiment.

FIG. 5 is a flowchart illustrating a method of receiving information about a codec supported by the second device, according to another exemplary embodiment.

In operation 510, the first device receives an identifier of at least one codec supported by the second device from the second device.

That is, in the exemplary embodiment shown in FIG. 5, even though the first device does not request anything from the second device, the second device transmits the identifier of the at least one codec supported by the second device to the first device.

In operation 520, the first device transmits an acknowledgement (ACK) frame indicating that the identifier of the at least one codec supported by the second device has been received to the second device.

In another exemplary embodiment, operation 520 may be omitted.

Figure 6:
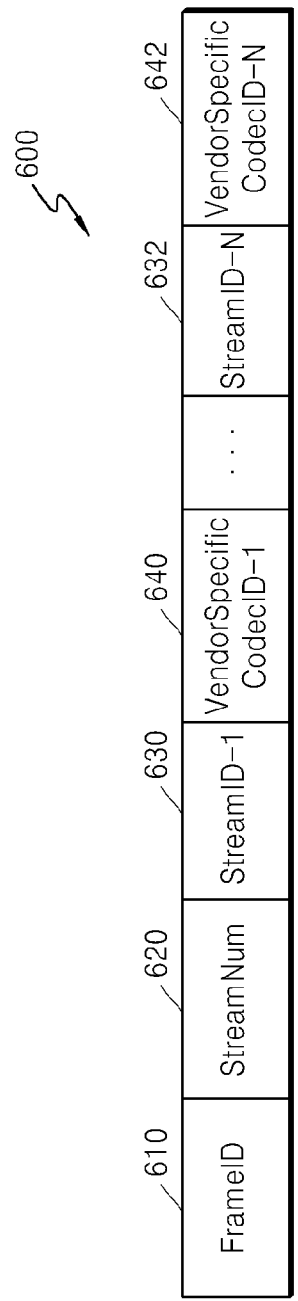
FIG. 6 is a diagram for describing a structure of a codec selection request frame according to an exemplary embodiment.

FIG. 6 is a diagram for describing a structure of a codec selection request frame 600 according to an exemplary embodiment.

Referring to FIG. 6, the codec selection request frame 600 may include a frame identifier field (Frame ID) 610, a stream number field (StreamNum) 620, stream identifier fields (StreamID-1 to StreamID-N) 630 through 632, and vendor specific codec identifier fields (VendorSpecificCodecID-1 to VendorSpecificCodecID-N) 640 through 642.

The frame identifier field 610 indicates that the codec selection request frame 600 is a frame for requesting selection of a codec to be applied to video content to be transmitted by the first device.

The stream number field 620 indicates the number of video contents to be transmitted by the first device.

The stream identifier fields 630 through 632 indicate identifiers of video contents to be transmitted by the first device. In FIG. 6, N content identifier fields 630 through 632 corresponding to N video contents are shown.

The vendor specific codec identifier fields 640 through 642 indicate identifiers of codecs to be used for compression of video contents to be transmitted by the first device. In FIG. 6, N vendor specific codec identifier fields 640 through 642 corresponding to N codecs are shown. The N vendor specific codec identifier fields 640 through 642 may include identifiers of N different types of codecs.

Figure 7:
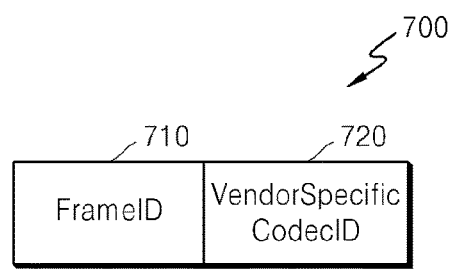
FIG. 7 is a diagram for describing a structure of a codec selection request frame according to another exemplary embodiment.

FIG. 7 is a diagram for describing a structure of a codec selection request frame 700 according to another exemplary embodiment.

Referring to FIG. 7, the codec selection request frame 700 may include a frame identifier field (FrameID) 710 and a vendor specific codec identifier field (VendorSpecificCodecID) 720.

The frame identifier field 710 indicates that the codec selection request frame 700 is a frame for requesting selection of a codec to be applied to video content to be transmitted by the first device.

The vendor specific codec identifier field 720 indicates an identifier of a codec to be used for compression of at least one video content to be transmitted by the first device.

For example, when the codec selection request frame 700 includes the single vendor specific codec identifier field 720, all video contents following transmission of the codec selection request frame 700 are requested to be compressed by the codec corresponding to the identifier recorded in the vendor specific codec identifier field 720 and then transmitted.

The identifier of the codec recorded in the vendor specific codec identifier field 720 may have a format defined by a codec vendor.

Figure 8:
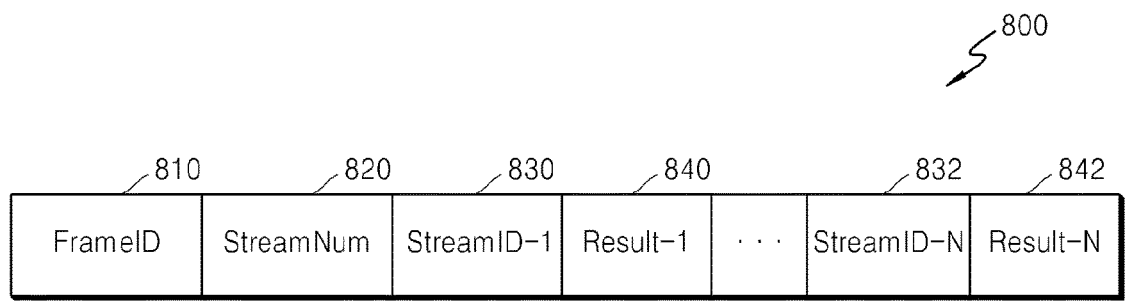
FIG. 8 is a diagram for describing a structure of a codec selection response frame according to an exemplary embodiment.

FIG. 8 is a diagram for describing a structure of a codec selection response frame 800 according to an exemplary embodiment.

Referring to FIG. 8, the codec selection response frame 800 may include a frame identifier field (FrameID) 810, a stream number field (StreamNum) 820, stream identifier fields (StreamID-1 to StreamID-N) 830 through 832, and result information fields (Result-1 to Result-N) 840 through 842.

The frame identifier field 810 indicates that the codec selection response frame 800 is a response frame with respect to the codec selection request frames 600 and 700.

The stream number field 820 indicates the number of video contents to be received by the second device.

The stream identifier fields 830 through 832 indicate identifiers of video contents to be received by the second device.

The result information fields 840 through 842 indicate result information regarding the use of codecs corresponding to the identifiers of the codecs included in the codec selection request frames 600 and 700. Some of the result information fields 840 through 842 may indicate information approving the use of the codecs corresponding to the identifiers of the codecs included in the codec selection request frames 600 and 700, and some of the result information fields 840 through 842 may indicate information rejecting the use of the codecs corresponding to the identifiers of the codecs included in the codec selection request frames 600 and 700.

Figure 9:
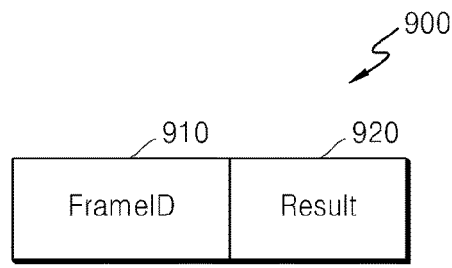
FIG. 9 is a diagram for describing a structure of a codec selection response frame according to an exemplary embodiment.

FIG. 9 is a diagram for describing a structure of a codec selection response frame 900 according to an exemplary embodiment.

Referring to FIG. 9, the codec selection response frame 900 may include a frame identifier field (FrameID) 910 and an result information field (Result) 920.

The frame identifier field 910 indicates that the codec selection response frame 900 is a response frame with respect to the codec selection request frames 600 and 700.

The result information field 920 indicates result information regarding the use of at least one codec corresponding to the identifier of the at least one codec included in the codec selection request frames 600 and 700. In other words, the result information field 920 shown in FIG. 9 may indicate whether the use of all codecs corresponding to identifiers of all the codecs included in the codec selection request frames 600 and 700 is approved.

FIG. 10 is a diagram for describing a structure of a video content frame 1000 according to an exemplary embodiment.

Referring to FIG. 10, the video content frame 1000 may include a frame type field (FrameType) 1010, a stream identifier field (StreamID) 1020, a length field (Length) 1030, and a compressed video payload field (Compressed video payload) 1040.

The frame type field 1010 includes frame type information indicating a type of compression applied to video content included in the video content frame 1000.

More specifically, the frame type field 1010 indicates whether the video content included in the compressed video payload field 1040 of the video content frame 1000 has been compressed by a first codec which is a default codec or one of second codecs which are provided by codec vendors.

The default codec may be an H.264 codec.

The frame type field 1010 may further include an identifier of a codec used for compression of the video content included in the compressed video payload field 1040 of the video content frame 1000.

Values of the frame type field 1010 will be described later with reference to FIG. 11. The structure of the frame type field 1010 will be described later with reference to FIGS. 12 through 14.

The stream identifier field 1020 indicates a content identifier of the video content included in the video content frame 1000.

The length field 1030 indicates the length of the video content frame 1000.

The compressed video payload field 1040 includes the video content compressed by the codec used for compression.

FIG. 11 is a diagram for describing the frame type field 1010 according to an exemplary embodiment.

Referring to FIG. 11, when the frame type field 1010 has a value of 0x00, it means that a frame is a non-compressed video data frame; when the frame type field 1010 has a value of 0x01, the frame including the frame type field 1010 is a video data frame compressed by an H.264 codec; and when the frame type field 1010 has a value of 0x02, the frame including the frame type field 1010 is a video frame compressed by a vendor specific codec designated by a codec vendor.

FIG. 12 is a diagram for describing a structure of a frame type field 1200 according to an exemplary embodiment.

Referring to FIG. 12, the frame type field 1200 indicates whether the video content included in the video content frame 1000 has been compressed by a first codec, which is a default codec, or one of second codecs provided by codec vendors.

The default codec may be an H.264 codec.

The frame type field 1010 may further include an identifier of a codec used for compression of the video content included in the compressed video payload field 1040 of the video content frame 1000.

For example, the frame type field 1200 having a value of 0 indicates that the first codec has been used to compress the video content; the frame type field 1200 having a value of 1 indicates that one of the second codecs has been used for the compression.

The size of the frame type field 1200 is 1 bit as shown in FIG. 12. However, the size of the frame type field 1200 may alternatively be more than one bit.

FIG. 13 is a diagram for describing a structure of a frame type field 1300 according to another exemplary embodiment.

Referring to FIG. 13, the frame type field 1300 may include a first field 1310 and a second field 1320.

The first field 1310 indicates whether the video content included in the video content frame 1000 has been compressed by the first codec, which is the default codec, or by one of the second codecs provided by codec vendors.

The second field 1320 indicates which one of the second codecs has been used to compress the video content included in the video content frame 1000.

For example, the second field 1320 may include an identifier of the second codec used to compress the video content included in the video content frame 1000.

In another exemplary embodiment, the frame type field 1310 may include the second field 1302 only when the video content included in the video content frame 1000 has been compressed by one of the second codecs.

A receiving side which has received the video content frame 1000 including the frame type field 1310 shown in FIG. 13 reads the first field 1310. If the receiving side determines that the video content included in the video content frame 1000 has been compressed by the first codec, the receiving side may ignore and not read the second field 1320.

The sizes of the first field 1310 and the second field 1320 may vary without being limited to 1 bit and N bits shown in FIG. 13.

FIG. 14 is a diagram for describing a structure of a frame type field 1400 according to another exemplary embodiment.

Referring to FIG. 14, the frame type field 1400 is a field having a size of N bits. The frame type field 1400 indicates which one of the first codec, that is, the default codec, and the second codecs provided by codec vendors has been used to compress the video content included in the video content frame 1000.

For example, the frame type field 1400 may include an identifier of the codec used to compress the video content included in the video content frame 1000 among the first codec and the second codecs.

Figure 15:
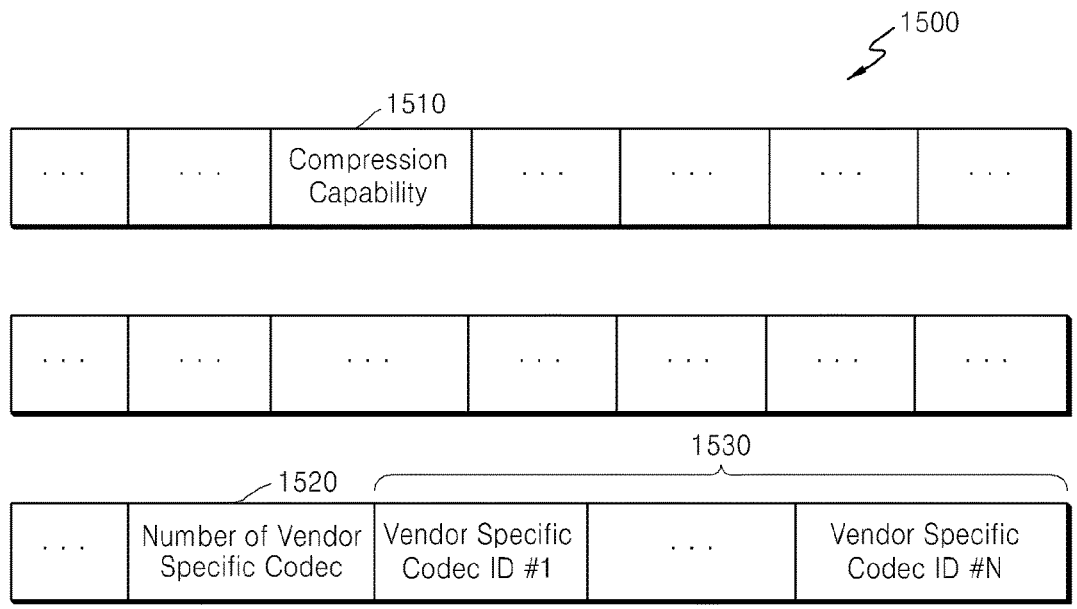
FIG. 15 is a diagram for describing a structure of a capability request frame according to an exemplary embodiment.

FIG. 15 is a diagram for describing a structure of a capability request frame 1500 according to an exemplary embodiment.

Referring to FIG. 15, the capability request frame 1500 may include a compression capability field 1510, a number of vendor specific codec field (Number of Vendor Specific Codec) 1520, and vendor specific codec identifier fields (VendorSpecificCodecID #1-#N) 1530.

The compression capability field 1510 indicates whether the first device supports a video content compression capability.

The number of vendor specific codec field 1520 indicates the number of vendor specific codecs supported by the first device.

The vendor specific codec identifier fields 1530 indicate an identifier of at least one codec supported by the first device. In FIG. 15, N vendor codec identifier fields 1530 corresponding to N codecs are shown.

Figure 16:
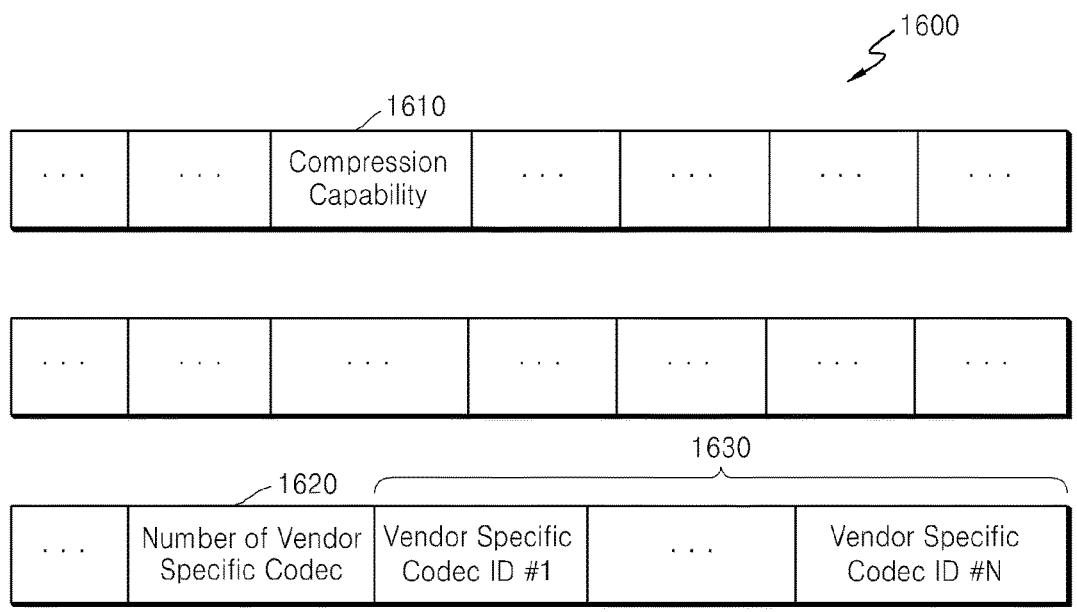
FIG. 16 is a diagram for describing a structure of a capability response frame according to an exemplary embodiment.

FIG. 16 is a diagram for describing a structure of a capability response frame 1600 according to an exemplary embodiment.

Referring to FIG. 16, the capability response frame 1600 may include a codec capability field 1610, a number of vendor specific codec field 1620, and vendor specific codec identifier fields (Vendor Specific Codec ID #1-#N) 1630. The capability response frame 1600 has the same structure as the capability request frame 1500 shown in FIG. 15.

The codec capability field 1610 indicates whether the second device supports a video content compression capability.

The number of vendor specific codec field 1620 indicates the number of vendor specific codecs supported by the second device.

The vendor specific codec identifier fields 1630 indicate an identifier of at least one codec supported by the second device. In FIG. 16, N vendor specific codec identifier fields 1630 corresponding to N codecs are shown.

Figure 17:
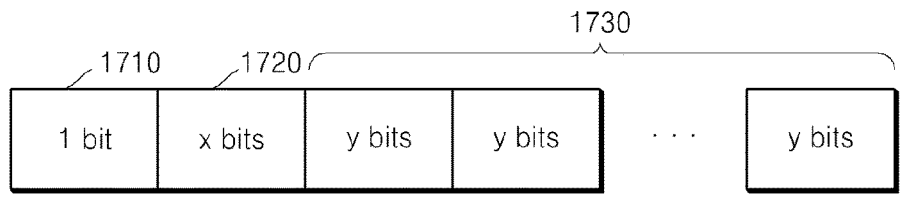
FIG. 17 is a diagram for describing information about a capability of a first device according to an exemplary embodiment.

FIG. 17 is a diagram for describing information 1700 about a capability of the first device (or first device capability information 1700) according to an exemplary embodiment.

Referring to FIG. 17, the first device capability information 1700 may include a codec support field 1710, a codec number field 1720, and codec identifier fields 1730.

The codec support field 1710 indicates whether the first device supports second codecs provided by codec vendors.

The size of the codec support field 1710 is 1 bit as shown in FIG. 17. However, alternatively, the size of the codec support field 1710 may be more than one bit.

The codec number field 1720 is a field having a size of x bits, indicating the number of second codecs supported by the first device.

The codec identifier fields 1730 are fields having a size of y bits, indicating identifiers of the second codecs supported by the first device.

A receiving side having received the first device capability information 1700 shown in FIG. 17 reads the codec support field 1710, and may ignore and not read the codec number field 1720 and the codec identifier fields 1730 if it is determined that the first device does not support the second codecs.

Figure 18:
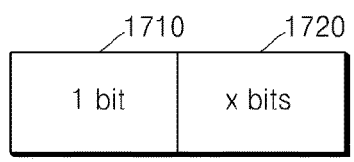
FIG. 18 is a diagram for describing information about a capability of a first device according to another exemplary embodiment.

FIG. 18 is a diagram for describing the first device capability information 1700 according to another exemplary embodiment.

Referring to FIG. 18, the first device capability information 1700 may include the codec support field 1710 and the codec number field 1720.

The codec support field 1710 and the codec number field 1720 shown in FIG. 18 have the same structures as the codec support field 1710 and the codec number field 1720 shown in FIG. 17, and thus will not be described in detail.

The first device capability information 1700 shown in FIGS. 17 and 18 may be included in the capability request frame 1500.

Figure 19:
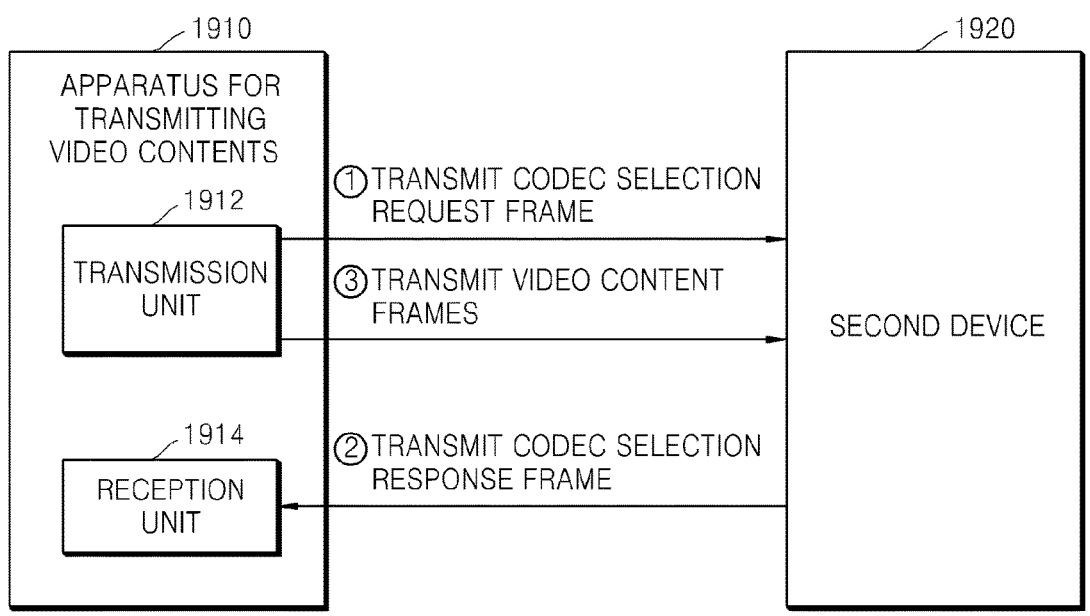
FIG. 19 is a block diagram of an apparatus for transmitting video contents according to an exemplary embodiment.

FIG. 19 is a block diagram of an apparatus 1910 for transmitting video contents, according to an exemplary embodiment.

Referring to FIG. 19, the apparatus 1910 may include a transmission unit 1912 and a reception unit 1914. It is assumed that the apparatus 1910 is mounted on a first device (not shown) in the current exemplary embodiment. However, in another exemplary embodiment, the apparatus 1910 may be the first device. For convenience of explanation, a second device 1920 is further shown in FIG. 19. The transmission unit 1912 and the reception unit 1914 may each be circuits configured to transmit and receive signals, respectively.

The transmission unit 1912 transmits a codec selection request frame including an identifier of at least one codec to be used for compression of at least one video content to the second device 1920.

The reception unit 1914 receives a codec selection response frame including at least one approval information indicating whether the use of the at least one codec is approved from the second device 1920.

The transmission unit 1912, upon receiving the codec selection response frame, transmits video content frames for the at least one video content compressed by the approved at least one codec to the second device, based on the codec selection response frame.

The transmission unit 1912 may further transmit a capability request frame, which includes an identifier of at least one codec supported by the first device and requests information about a capability of the second device 1920. The reception unit 1914 may further receive a capability response frame, which includes an identifier of at least one codec supported by the second device 1920 in response to the capability request frame, from the second device 1920.

The transmission unit 1912 may further transmit first device capability information to the second device 1920, and the reception unit 1914 may further receive the identifier of the at least one codec supported by the second device from the second device 1920.

The exemplary embodiments can be embodied as a program that can be implemented on computers and embedded devices and can be implemented in general-purpose digital computers that execute the program using recording media.

Examples of the recording media include magnetic storage media such as read-only memory (ROM), floppy disks, and hard disks, and optical data storage devices such as CD-ROMs and digital versatile discs (DVD).

While the present inventive concept has been particularly shown and described with reference to exemplary embodiments thereof, it will be understood by one of ordinary skill in the art that various changes in form and detail may be made therein without departing from the spirit and scope as defined by the following claims. Accordingly, the disclosed exemplary embodiments should be considered in a descriptive sense and not in a restrictive sense. The scope of the present inventive concept will be defined by the appended claims, and differences in scope equivalent to the appended claims should be construed as being included in the present inventive concept.

What is claimed is:

1. A method of transmitting compressed at least one video content, the method comprising:
   transmitting a codec selection request frame prior to compression of the at least one video content, the codec selection request frame comprising an identifier of at least one codec among a plurality of codecs to be used for the compression of the at least one video content and requesting approval of a use of the at least one codec among the plurality of codecs;
   receiving a codec selection response frame, the codec selection response frame comprising at least one result information indicating whether the use of the at least one codec among the plurality of codecs is approved; and
   transmitting a video content frame comprising the at least one video content compressed by the approved at least one codec based on the codec selection response frame,
   wherein the video content frame further comprises frame type information indicating a type of compression applied to the at least one video content in the video content frame.

2. The method of claim 1, wherein the frame type information indicates whether the at least one video content in the video content frame has been compressed by a first codec, which is a default codec, or by one of a plurality of second codecs, which are codecs provided by codec vendors, and
   wherein at least one of the plurality of codecs is a codec provided by a codec vendor.

3. The method of claim 1, wherein the frame type information comprises a first field indicating whether the at least one video content in the video content frame has been compressed by a first codec, which is a default codec, or by one of a plurality of second codecs, which are codecs provided by codec vendors.

4. The method of claim 3, wherein the frame type information further comprises a second field indicating which one of the plurality of second codecs has been used to compress the at least one video content in the video content frame.

5. The method of claim 1, wherein the frame type information comprises a field indicating which one of a group of codecs including a first codec, which is a default codec, and a plurality of second codecs, which are codecs provided by codec vendors, has been used to compress the at least one video content in the video content frame.

6. The method of claim 1, further comprising:
transmitting, from a first device, an identifier of at least one codec supported by the first device to a second device; and
receiving, by the first device, an identifier of at least one codec supported by the second device from the second device,
wherein the identifier of the at least one codec among the plurality of codecs included in the codec selection request frame is generated based on the identifier of the at least one codec supported by the second device.

7. The method of claim 1, further comprising:
transmitting, from a first device, a capability request frame requesting information about a capability of a second device to the second device; and
receiving a capability response frame comprising an identifier of at least one codec supported by the second device from the second device in response to the capability request frame,
wherein the identifier of the at least one codec among the plurality of codecs included in the codec selection request frame is generated based on the capability response frame.

8. The method of claim 7, wherein the capability request frame comprises a codec support field indicating whether the first device supports second codecs, which are codecs provided by codec vendors, and a codec number field indicating a number of second codecs supported by the first device.

9. The method of claim 8, wherein the capability request frame further comprises a codec identifier field indicating identifiers of the second codecs.

10. The method of claim 1, further comprising receiving an identifier of the at least one supported codec,
wherein the identifier of the at least one codec among the plurality of codecs included in the codec selection request frame is generated based on the received identifier of the at least one supported codec.

11. An apparatus for transmitting compressed at least one video content, the apparatus comprising:
a transmission unit that transmits a codec selection request frame prior to compression of the at least one video content, the codec selection request frame comprising an identifier of at least one codec among a plurality of codecs to be used for the compression of the at least one video content and requesting approval of a use of the at least one codec among the plurality of codecs; and
a reception unit that receives a codec selection response frame, the codec selection response frame comprising at least one result information indicating whether the use of the at least one codec among the plurality of codecs is approved,
wherein the transmission unit further transmits a video content frame comprising the at least one video content compressed by the approved at least one codec based on the codec selection response frame, and
wherein the video content frames further comprises frame type information indicating a type of compression applied to the at least one video content in the video content frame.

12. The apparatus of claim 11, wherein the frame type information indicates whether the at least one video content in the video content frame has been compressed by a first codec, which is a default codec, or by one of a plurality of second codecs, which are codecs provided by codec vendors, and
wherein at least one of the plurality of codecs is a codec provided by a codec vendor.

13. The apparatus of claim 11, wherein the frame type information comprises a first field indicating whether the at least one video content in the video content frame has been compressed by a first codec, which is a default codec, or by one of a plurality of second codecs, which are codecs provided by codec vendors.

14. The apparatus of claim 13, wherein the frame type information further comprises a second field indicating which one of the plurality of second codecs has been used to compress the at least one video content in the video content frame.

15. The apparatus of claim 11, wherein the frame type information comprises a field indicating which one of a group of codecs including a first codec, which is a default codec, and a plurality of second codecs, which are codecs provided by codec vendors, has been used to compress the at least one video content in the video content frame.

16. The apparatus of claim 11, wherein:
the transmission unit is included in a first device and further transmits an identifier of at least one codec supported by the first device to a second device,
the reception unit is included in the first device and further receives an identifier of at least one codec supported by the second device from the second device, and
the identifier of the at least one codec among the plurality of codecs in the codec selection request frame is generated based on the identifier of the at least one codec supported by the second device.

17. The apparatus of claim 11, wherein:
the transmission unit is included in a first device and further transmits a capability request frame requesting information about a capability of a second device to the second device,
the reception unit further receives a capability response frame comprising an identifier of at least one codec supported by the second device from the second device in response to the capability request frame, and
the identifier of the at least one codec among the plurality of codecs included in the codec selection request frame is generated based on the capability response frame.

18. The apparatus of claim 17, wherein the capability request frame comprises a codec support field indicating whether the first device supports second codecs, which are codecs provided by codec vendors, and a codec number field indicating a number of second codecs supported by the first device.

19. The apparatus of claim 18, wherein the capability request frame further comprises a codec identifier field indicating identifiers of the second codecs.

20. The method of claim 11, wherein:
the reception unit further receives an identifier of at least one supported codec, and
the identifier of the at least one codec among the plurality of codecs in the codec selection request frame is generated based on the received identifier of the at least one supported codec.

21. A non-transitory computer-readable recording medium having recorded thereon a program for executing the method of claim 1.

22. The method of claim 1, wherein the at least one codec comprises one codec and another codec, the one codec and the another codec being different.

\* \* \* \* \*